US007238402B2

(12) United States Patent
Swales et al.

(10) Patent No.: US 7,238,402 B2
(45) Date of Patent: *Jul. 3, 2007

(54) GLASS FIBERS AND MATS HAVING IMPROVED SURFACE STRUCTURES IN GYPSUM BOARDS

(75) Inventors: Timothy G. Swales, Aurora, CO (US); Philippe M. Scheerlinck, Lakewood, CO (US); Thomas G. Grassl, Wertheim (DE)

(73) Assignee: Johns Manville, Denver, CO (US)

( * ) Notice: Subject to any disclaimer, the term of this patent is extended or adjusted under 35 U.S.C. 154(b) by 175 days.

This patent is subject to a terminal disclaimer.

(21) Appl. No.: 10/796,951

(22) Filed: Mar. 10, 2004

(65) Prior Publication Data

US 2005/0202258 A1    Sep. 15, 2005

(51) Int. Cl.
*B32B 1/04* (2006.01)

(52) U.S. Cl. ........................ 428/70; 428/71; 428/292.1; 428/309.9; 428/294.7; 428/312.4; 428/319.1; 428/405; 428/420; 428/426

(58) Field of Classification Search .............. 428/292.1, 428/312.4, 319.1, 294.7, 309.9, 70, 71, 420, 428/426
See application file for complete search history.

(56) References Cited

U.S. PATENT DOCUMENTS

| 3,896,253 | A | | 7/1975 | Elmer ......................... 428/382 |
|---|---|---|---|---|
| 4,006,272 | A | | 2/1977 | Sakaguchi et al. .......... 428/268 |
| 4,011,195 | A | | 3/1977 | Self ........................... 260/40 R |
| 4,358,502 | A | | 11/1982 | Dunbar ....................... 428/283 |
| 5,330,827 | A | | 7/1994 | Hansen ....................... 428/283 |
| 5,817,262 | A | * | 10/1998 | Englert ......................... 264/86 |
| 5,863,846 | A | | 1/1999 | Rorabaugh et al. ......... 442/136 |
| 5,888,393 | A | | 3/1999 | Luhman et al. .......... 210/510.1 |
| 5,955,387 | A | | 9/1999 | Garrigus ..................... 442/332 |
| 5,981,406 | A | | 11/1999 | Randall ....................... 442/71 |
| 5,985,405 | A | | 11/1999 | Doucette, Jr. et al. ........ 428/86 |
| 6,010,596 | A | * | 1/2000 | Song .......................... 162/158 |
| 6,106,607 | A | * | 8/2000 | Be et al. ..................... 106/781 |
| 6,187,697 | B1 | * | 2/2001 | Jaffee et al. ................. 442/149 |
| 6,299,959 | B1 | | 10/2001 | Squires et al. ................ 428/87 |
| 6,342,284 | B1 | * | 1/2002 | Yu et al. ........................ 428/70 |
| 6,417,125 | B1 | | 7/2002 | Rorabugh et al. .......... 501/95.1 |
| 6,773,822 | B2 | * | 8/2004 | Capps ...................... 428/537.7 |
| 6,800,361 | B2 | * | 10/2004 | Bruce et al. .............. 428/294.7 |
| 2003/0114065 | A1 | | 6/2003 | Peng et al. .................. 442/327 |
| 2003/0211305 | A1 | | 11/2003 | Koval et al. ............. 428/292.4 |

FOREIGN PATENT DOCUMENTS

| JP | 5009041 A2 | 1/1993 |
|---|---|---|
| JP | 2002088627 A2 | 3/2002 |
| RU | 2209789 C2 | 8/2003 |

OTHER PUBLICATIONS

Schmidt, H.K., *Molecular Crystals and Liquid Crystals* (2000), vol. 353, "Nanoparticles for Ceramic and Nanocomposite Processing", p. 165-79, 26 refs.
Schmidt, H., *Macomol. Symp.* (2000) 159 (Oct.), "Sol-Gel Derived Nanoparticles as Inorganic Phases in Polymer-Type Matrices", p. 43-55, 13p, 20f, 491.
Malinauskas, A., *Polymer*, Apr. 2001, vol. 42, No. 9, "Chemical Deposition of Conducting Polymers", p. 3957-72.
Hague, A. et al., *Journal of Composite Materials*, v. 37(20), 2003, Iss.No. 0021-9983, "S2- Glass/Epoxy Polymer Nanocomposites: Manufacturing, Structures, Thermal and Mechanical Properties", p. 1821-1837.
Gracia-Rejon, A. et al., *Society of Plastics Engineers*, ANTEC 2002 Proceedings, 60 annual technical conference, Accession No. 2003:6589 APOLLIT, "Injection Molding of Glass Fiber Reinforced PA-6 Nanocomposites".
Schmidt, H. et al., *10th International Workshop on Glass and Ceramics, Hybrids and Nanocomposites from Gels: Sol-Gel '99*, Netherlands 2000 Graphs, 128 ref., "The Sol-Gel Process as a Basic Technology for Nanoparticle-Dispersed Inorganic-Organic Composites", p. 39-51.

* cited by examiner

*Primary Examiner*—Leszek Kiliman
(74) *Attorney, Agent, or Firm*—Robert D. Touslee

(57) ABSTRACT

A gypsum board having roughened surface glass fiber reinforcement. The roughened surface of glass fiber is created by incorporating nano or micro particles of colloidal silica or clay or other inorganic particles in a silane based sizing composition. The sizing coating is partially or completely cured and incorporated in gypsum wet mix either as additions of chopped fibers or as placement of roughened surface glass fiber mats at selected locations within a cast gypsum sheet. The roughened surface of glass fiber with nano or micro particles compliantly bonded with silane polymer transfers load from gypsum to glass fibers providing improved strength and flexure resistance of gypsum boards.

16 Claims, 3 Drawing Sheets

GLASS FIBERS AND MATS HAVING IMPROVED SURFACE STRUCTURES IN GYPSUM BOARDS

BACKGROUND OF THE INVENTION

1. Field of the Invention

The present invention relates to glass fibers and mats for gypsum boards having improved surface finishes; and more particularly to surface finishes comprising nano or micro particles irreversibly attached to the fibers' external surfaces to thereby provide an improved bond with the gypsum matrix that provides superior board strength.

2. Description of the Prior Art

Many patents address issues related to the use of glass fibers in various composite matrix compositions. Treatment of glass fibers to improve the bonding properties with the matrix has been addressed. None of these patents, however, relate to a method of irreversibly attaching nano or micro particles to a glass fiber, which is incorporated in a gypsum matrix as a strengthening reinforcement.

U.S. Pat. No. 3,896,253 to Elmer discloses bonding glass fibers to rubber. An aqueous alkaline dispersion of a rubbery vinyl pyridine copolymer, a stabilized colloidal silica sol, and a heat reactable resorcinol-formaldehyde resole, in certain amounts, is useful in forming an adhesive for bonding glass fiber reinforcing elements or cords to rubber compounds or stocks. After dipping the glass fiber cord in the one-step adhesive dip, the coated cord is heated to dry it and heat cure or heat set the adhesive on the cord. Thereafter, the adhesive containing glass fiber cord is combined or laminated (calendered) with a curable rubber compound and the resulting assembly is cured to form a composite in which the glass fiber cord is bonded to the rubber by means of the adhesive. The aqueous alkaline dispersion composition is made from 100 parts by weight (dry) of a rubbery vinyl pyridine copolymer, about 0.5 to 20 parts by weight of silica as a stabilized colloidal silica sol, about 10 to 75 parts by weight of a heat treatable water soluble resorcinol-formaldehyde resole, about 0 to 3 parts by weight of an alkaline material selected from the group consisting of NH40H, KOH and NaOH, and about 150 to 1100 parts by weight of water. The '253 patent discloses bonding glass fibers to rubber. The glass fibers are coated with colloidal silica with a resorcinol-formaldehyde resole binder to produce a smooth finish to avoid blister formation. No disclosure is contained therein concerning use of nano or micro particles irreversibly attached to glass fibers providing a rough surface for use as reinforcement in a gypsum matrix.

U.S. Pat. No. 4,006,272 to Sakaguchi et al. discloses a process for preparing resin-impregnated glass fiber mats in which the binder resin has a high rate of dissolution in vinyl monomers. The binder resin is a styrene resin or copolymer composed mainly of styrene, which has a melting point of 100° to 150° C. and a molecular weight of 2500 to 7000, or a mixture of said styrene resin or copolymer with an unsaturated polyester resin having a melting point of 80° to 130° C. The glass fiber mat prepared according to the process disclosed in the '272 patent is used as a reinforcement in the fabrication of fiber reinforced plastic (FRP) products. More specifically, in accordance with conventional procedure, an unsaturated polyester resin or vinyl ester resin, as the matrix resin component for preparing the FRP, is dissolved in a vinyl monomer, the above glass fiber mat is immersed in the thus-formed solution with no nano or micro particulate matter, and the matrix resin is cured at a low pressure in the presence of a catalyst at room temperature or at an elevated temperature to prepare a FRP product. The use of the glass fiber mat whose binder can rapidly be dissolved in vinyl monomers results in good moldability of the FRP product, high speed production of planar plates or undulating plates or sheets of FRP molded. The '272 patent discloses a process for the preparation of glass fiber mats; but does not disclose glass fibers coated with nano or micro particles to produce a roughened external surface. In addition, the matrix disclosed in the '272 patent is not a gypsum matrix.

U.S. Pat. No. 4,011,195 to Self discloses polymerizable compositions containing unsaturated polyester resins and aqueous alkali metal silicate. Also disclosed is a method of preparing shaped articles from such compositions and thermoset products. Polymerizable unsaturated polyester resin syrups can be extended with aqueous alkali metal silicate in compositions containing from 0.1 to 10.0 parts by weight of aqueous alkali metal silicate for each part by weight of the unsaturated polyester resin syrup. The preferred alkali metal silicate is aqueous sodium silicate. Compositions further can be extended (a) by the addition of reactive fillers such as metal oxides or hydrated metallic salts; (b) by the addition of inert fillers such as clay, silica, glass fibers, perlite; or (c) by the addition of both (a) and (b). The fillers also may include fibrous reinforcing materials such as dispersed glass fibers, randomly oriented fiber mats, wound filaments and woven fabrics. The fillers may be present in amounts from about 0.1 to about 5 times the combined weight of aqueous alkali metal silicate and unsaturated polyester resin syrup. Compositions thereby produced can be employed in coatings, laminates, cast articles, molded articles, or other shaped articles. The polymerized products are resistant to combustion, have low fuel content, low flame spread properties and are useful thermal insulating materials. Such products furthermore have a low smoke content. When exposed to fire, the organic content of these materials is burned and the residual inorganic content is converted to a refractory ceramic material, which resists further thermal deterioration and functions as a thermal insulator to resist thermal transfer. The '195 patent discloses polymerizable compositions containing unsaturated polyester resins extended with aqueous alkali metal silicate and fillers including glass fibers. Further disclosed is a method of preparing shaped articles from such compositions, and thermoset products composed thereof. Articles prepared in accordance with the '195 patent teaching are heat resistant, polyester articles impregnated with metal silicates, glass fibers, clay and inorganic materials which remain even after the article is burnt. The glass fibers are not coated irreversibly with nano or micro particles; and are not incorporated into a gypsum matrix.

U.S. Pat. No. 4,358,502 to Dunbar discloses a glass fiber mat for reinforcing polyamides. The mat comprises randomly disposed multi filament glass strands of indefinite length bonded to each other within a binder. Such binder consists essentially of the dried residue of an aqueous dispersion of emulsified polyurethane or epoxy resin having an average particle diameter of at least about 0.6 µm and an amine-functional organosilane. Individual filaments are sized with a mixture of an amine-functional organosilane and an amide reaction product of a fatty acid with an aliphatic polyamine. The reaction product has residual amine functionality and provides improved impact strength when used to reinforce thermoplastic, and especially polyamide, laminates that are stamped to form shaped articles. The '502 patent discloses a glass fiber mat for reinforcing polyamides. The glass fibers are bonded with an aqueous dispersion of polyurethane or epoxy together with organosilane compositions. The organosilane allows bonding of the glass fiber mat with thermoplastic resin such as polyamide to form stampable laminates and articles. The glass fibers are not bonded to nano or micro particles and the matrix is a thermoplastic polyamide, not a gypsum matrix.

U.S. Pat. No. 4,824,890 to Glover et al. discloses film forming silicone microemulsions. A curable, reinforced polydiorganosiloxane microemulsion is prepared by adding from 5 to 30 parts by weight of colloidal silica per 100 parts by weight of polydiorganosiloxane in the microemulsion and from 1 to 5 parts by weight of dialkyltindicarboxylate catalyst per 100 parts by weight of the microemulsion to a polydiorganosiloxane microemulsion. The curable, reinforced polydiorganosiloxane emulsion can be cast into coherent, elastomeric films of less than 0.4 micrometer thickness. The '490 patent does not discloses a silane based composition with nano or micro particles providing a roughened glass fiber surface and incorporated into a gypsum board.

U.S. Pat. No. 5,330,827 to Hansen discloses reinforcing fibers made from polyolefin and polyolefin derivatives, the fibers having a thickness of 10-100 μm and containing inorganic particles of a size of 1-10 μm in an amount of at least 12% by weight, calculated on the total fiber weight. The particles are embedded in the polyolefin or polyolefin derivative, with substantially none of the particles being exposed at fiber surfaces. The inorganic particles are preferably chalk or barium sulfate. The fibers are prepared from a fibrillated, stretched, blown or cast film, which may have been subjected to a surface treatment such as a corona treatment or application of avivage. The reinforcing fibers are useful in composite materials comprising an inorganic binder such as cement and puzzolane. The '827 patent also discloses a method of producing the reinforcing fibers with embedded particles. However, none of the added inorganic particles are present at the surface of the fiber. In addition, this fiber is used as reinforcement in cement or puzzolane, not gypsum. The fiber used is polymeric. It is not a glass fiber, and has particles incorporated within the fiber; but not bonded to a glass fiber surface.

U.S. Pat. No. 5,786,080 to Andersen et al. discloses compositions and methods for the deposition of ettringite (3CaO-Al2O3.3Ca(SO4).30-32H2O) onto the surfaces of fibers, aggregates, or other fillers. The ettringite is produced in situ within an aqueous suspension while in proximity of the fibers, aggregates, or fillers, to form a mineralized composite material comprising ettringite coated fibers, aggregates or other fillers. The ettringite-coated materials can be added to hydraulically settable materials to improve the chemical and mechanical bond between the fibers or other substrate within the resulting hardened hydraulically settable materials, particularly cementitious or concrete material. The presence of the coated fiber materials is said generally to increase the toughness, flexibility, tensile strength, and flexural strength of the composite and articles made therefrom. It is indicated that the ability of fibers to modify the mechanical properties of a composite is dependent on the strength of the bonding between the fibers and the matrix material. The ettringite process is said to increase the roughness of the coated fibers, thereby enhancing the mechanical interlocking with the matrix over that achieved with relatively smooth glass fibers. The ettringite composition is an inorganic coating and does not have nano or micro particles incorporated within the coating. The ettringite composition is a brittle inorganic coating. It is not a silane based coating, and does not have the compliant properties of a silane based polymer. Moreover, the ettringite composition does not function to capture a nano or micro particle to provide a roughened glass fiber surface. In addition, the ettringite deposition does not result in a gypsum board that is flexure resistant or exhibits superior nail pull out.

U.S. Pat. No. 5,863,846 to Rorabaugh et al. discloses a rigidized fibrous ceramic insulation. A slurry is molded from ceramic fibers and/or microparticles to form a soft felt mat which is impregnated with a sol prior to drying the mat. A catalyst for the sol is caused to diffuse into the mat by exposing the mat to the catalyst and subjecting the mat to a soak time during which the catalyst diffuses into the mat and causes the sol to gel. The sol-gel binder forms bonds so that the mat is dimensionally stabilized. The mat is dried to produce ceramic insulation. Ceramic insulation having a consistent microstructure and a fully gelled sol-gel binder through its entire thickness is also provided. The '846 patent discloses a rigidized fibrous ceramic insulation. The ceramic fibers employed are not glass fibers and the particles are not coated onto ceramic fibers. Instead, such particles are part of the sol gel matrix. Clearly, there is no gypsum matrix in the ceramic insulation article.

U.S. Pat. No. 5,888,393 to Luhman discloses a microparticle enhanced fibrous ceramic baffle for cryogenic liquid containers. A ceramic composite comprising ceramic fibers and glass microparticles bound together as a porous matrix with a ceramic binder provides baffles for cryogenic fluids in a storage container. The microparticles enhanced fiber ceramic ('MEFC') is particularly applicable for containers for cryogenic fluids such as the liquid propellants, liquid oxygen and liquid hydrogen, especially where the containers for these liquids are subject to rapid motion, such as in an aircraft or spacecraft. The microparticle enhanced fiber ceramic is made by (i) forming a slurry comprising ceramic fibers and microparticles, preferably glass microballoons and or diatoms, in a liquid; (ii) dispersing the slurry over a form-defining surface and separating the liquid by vacuum therefrom to form a wet mat of fibers and glass microparticles; (iii) drying the mat; (iv) soaking the mat with a sol-gel ceramic precursor binder, preferably an alumina precursor; and (v) drying and curing the binder and mat at a sufficient temperature and for a sufficient period of time to convert the sol-gel precursor to ceramic, thereby forming the microballoon enhanced fibrous ceramic. Additives may be utilized in addition to the ceramic fiber and microballoons, such as single crystal whiskers (silicon carbide, silicon nitride, alumina, etc.) and diatoms, which may impart desirable properties to the MEFC, such as increased thermal resistance and bulk porosity, and reduced weight. The '393 patent discloses a microparticle enhanced fibrous porous ceramic baffle for cryogenic liquid containers. It uses ceramic fibers with micropartices of glass microballoons and diatoms together with other crystalline additives of silicon carbide and the like to form a porous container held together by a sol gel, which is preferably an alumina based composition. The '393 patent does not specifically disclose glass fibers, and nano or micro particles are not irreversibly bonded to the ceramic fibers. In addition, the matrix binding the ceramic fibers is a sol gel derived material, not a gypsum matrix.

U.S. Pat. No. 5,955,387 to Garrigus discloses a microform composite with intermediate reinforcing fiber cloth. A ceramic composite is provided comprising ceramic fibers, glass microballoons and/or diatoms, bound together with a ceramic reinforcing cloth with a sol-gel ceramic binder. The composite is particularly useful as a high strength, high temperature insulation material. The '387 patent discloses a reinforced ceramic composite comprising a felted mat of ceramic fibers having an intermediate reinforcing fiber cloth with a sol-gel binder infused into the mat. The ceramic fibers have micropartices of glass balloons and diatoms and form a high strength, high temperature insulation material held together by a cured sol gel composition. Specifically, the ceramic fibers are not glass, and nano or micro particles are not irreversibly bonded to the glass fiber. Moreover, the matrix binding the fibers is a sol gel derived material, not a gypsum matrix.

U.S. Pat. No. 5,981,406 to Randall discloses a glass mat with reinforcing binder. In a gypsum board faced with a fibrous mat, for example, a mat of glass filaments adhesively bound together, improvements are realized by the use of a reinforcing binder in the mat. The gypsum board has a set gypsum core with a non-woven glass fiber mat having a predetermined thickness adhered to at least one of the surfaces of the gypsum board. The glass fibers in the mat are bound together by an adhesive and a reinforcing resinous binder extending partway through the thickness into the interstices of the mat. Improved gypsum board properties are achieved by use of amounts of a reinforcing resinous binder which do not significantly change the drying characteristics of the board. The '406 patent discloses a glass mat with reinforcing binder. A glass mat with resinous binder is placed on one surface of the gypsum slurry with the mat partially penetrating into the slurry. Additional resin is applied over the mat to penetrate the interstices in the mat. The glass mat reinforcement is on top of one of the surfaces of the gypsum board and contains a resin, which partially fills the mat. The gypsum also partially fills the mat. Thus, the glass mat disclosed in the '406 patent is not located within the gypsum matrix.

U.S. Pat. No. 5,985,405 to Doucette, Jr. et al. discloses a three dimensionally reinforced ablative/insulative composite. The three-dimensionally reinforced ablative/insulative composite includes a high density fabric-based ablative layer and a low density resin-based insulative layer that is chemically bound to the ablative layer. This composite further includes stitches composed of temperature-resistant thread, which extend through the ablative layer and form reinforcing loops within the insulative layer. These loops are preferably chemically and mechanically bound to the insulative layer. This three dimensionally reinforced ablative/insulative composite is a lightweight material, which is suitable for use as a heat shield against ablative heating during ballistic flight and thermal soak heating during non-ballistic flight. The bond, between the ablative layer and the insulative layer, has been multi-directionally reinforced to reduce the likelihood of separation of the layers. This is a heat shield material for rockets and missiles wherein carbon fibers are bonded together with charrable resins or siliconizable resins. The fibers used are not glass fibers and are not bonded to nano or micro particles. In addition, the matrix is sol gel based and is not a gypsum matrix.

U.S. Pat. No. 6,417,125 to Rorabaugh et al. discloses a ceramic insulation. A fibrous ceramic mat is molded from a slurry of ceramic fibers and/or ceramic micropartides and/or a metal. The slurry includes ceramic fibers and/or microparticles and/or metal particles, water or another appropriate carrier fluid and, optionally, a dispersant, a flocculant, or both. The mat is impregnated with a sol prior to drying. A catalyst for the sol is introduced into the mat to cause the sol to gel. The sol-gel binder forms bonds so that the mat is dimensionally stabilized. The mat is dried to produce the desired ceramic insulation that has preferably a consistent microstructure and a fully gelled sol-gel binder through its entire thickness. Use of metal results in corrosion or reaction with refractory binder. The metal particles are oxidized or nitrided in-situ to form a refractory binder or to enhance the sol binder. The refractory metal oxides or nitride reaction products augment or replace ceramic whiskers often included in the slurry. The process forms a mat from the slurry by injecting the slurry into a mold with sufficient back pressure to force a portion of the liquid out of the slurry through a porous surface of the mold and to leave a mat on the porous surface. It may also be used for forming ceramic insulation. Such ceramic insulation is a porous body comprising ceramic fibers and ceramic microparticles including glass microballoons bound together by a cured sol gel composition. The fibers disclosed in the '125 patent are not glass fibers and are not bonded to nano or micro particles. In addition, the matrix is sol gel based and not a gypsum matrix.

US Patent Application No. US 2003/0114065 to Peng et al. discloses fiber mats for materials of construction having improved tear strength. A coated fiber mat exhibits improved tear strength upon dividing pieces of the coated mat. The coating comprises a cured, non-woven, fiber glass mat containing a polysiloxane wherein the fibers are fixedly distributed in a formaldehyde type binder containing a binder modifier which is a crosslinked styrene/acrylic polymer. In addition, the '065 patent application discloses a process for the preparation of the mat. The '065 patent application discloses fiber mats for materials of construction having improved tear strength and a process for making the fiber mats. This process involves the manufacture of tear resistant asphalt roofing shingles provided with glass fiber reinforcement cured with siloxane. The glass fiber is not bonded to a microparticle and the matrix is asphalt, not gypsum.

US Patent Application US 2003/0211305 to Koval et al. discloses an interior wallboard and a method for making the wallboard. The gypsum wallboard comprises a paper-covered first face with shaped regions formed along side portions near the wallboard edges, and a fibrous mat-covered second face. The fibrous mat material covering the second face extends around the wallboard edges and is overlapped by portions of the paper on the first face. The wallboard can be manufactured by depositing a gypsum slurry onto a moving web of the fibrous mat material, applying a web of the paper to the deposited gypsum slurry, and forming shaped regions in the side portions of the top surface. The gypsum wallboard has a paper-covered first face with shaped regions near the edges, and a second face covered with a water-resistant facing material, preferably a fibrous mat material, and more preferably a coated fibrous mat material. The paper-covered first face presents a good surface for painting or wallpapering. The second face, because of its preferred coated mat facing material, is resistant to water infiltration. The '305 patent application discloses interior wallboard and a method for manufacturing same. The gypsum board has a water resistant fibrous mat on one side as a facer and a paper facer on the other side suitable for painting. The fibrous mat disclosed by the '305 patent application does not use glass fibers with bonded micro particles. In addition the fibrous mat is not incorporated within the gypsum matrix, but only functions as a facer.

Foreign Patent No. JP 5009041 to Kagawa discloses fiber reinforced glass and a method for manufacture thereof. The fiber reinforced glass is a glass laminate with glass fibers of a different composition than that of the present invention. In addition, the fiber reinforced glass is not situated in a gypsum matrix.

Foreign Patent Application No. JP 2002088627 to Jaffee discloses a fiber glass mat, method and laminate. The '627 patent application discloses a fiber glass mat, method and laminate. A mat of glass fibers is disposed in a novolac phenolic matrix. The '627 patent application does not disclose a gypsum matrix having reinforcing glass fibers. In addition, the fibers disclosed by the '627 patent application are not coated with particles to produce a rough fiber surface.

Foreign Patent No. RU 2209789 to Velpejri discloses fiberglass strands coated by inorganic particles and products composed thereof. Disclosed therein are mainly inorganic particle-coated glass fiber strands for printed circuit boards. The particles are chosen from graphite, metallic particles that are softer than the glass fiber. The methodology used to coat the glass fibers is not indicated. Rather there is produced a printed circuit board reinforced with inorganic powder coated reinforced glass fibers; not a gypsum board.

The Publication in Journal of Composite Materials (2003) v. 37(20), p. 1821-1837 discloses S2-glass/epoxy polymer nanocomposites: manufacturing; structures; thermal and mechanical properties. The nanoparticles of clay or nanosilicates are applied to glass fibers and the monomer of the epoxy composite is vacuum impregnated and cured. The improved strength of the composite is attributed to increased interfacial area between the nanoparticles and the epoxy matrix due to intercalation and or exfoliation of the nanoparticles. The nanoparticles are not bonded to the glass fiber. The matrix is epoxy based and is not a gypsum matrix reinforced with glass fibers.

The Publication in Society of Plastic Engineers, Brookfield, Conn.(US) (2002), ca. 5p. of CD-ROM Conference discloses injection molding of glass fiber reinforced PA-6 nanocomposites. The nanocomposite is an injection moldable polymer composite with short length fibers and low volume % of organoclay. The nanoparticles of clay are not bonded to the glass fiber. In addition, the Publication does not disclose a gypsum matrix composite with glass fiber reinforcement.

The Publication from the 10th International Workshop on Glass and Ceramics, Hybrids and Nonocomposites from Gels (2000 Graphs, 128 ref. p. 39-51) discloses sol-gel process as a basic technology for nanoparticle-dispersed inorganic-organic composites. The publication discloses a sol-gel process as a basic technology for nanoparticle-dispersed inorganic-organic composites. A glass fiber mat is coated with TEOS or METEOS and cured to develop a bond between fibers so that the mat has flexibility and strength and can withstand temperatures up to 600° C. The mat is not incorporated into a gypsum matrix, and nanoparticle-dispersed inorganic-organic composites are not bonded to the glass fiber. TEOS, MTMOS and MTEOS merely cure to create a bond between fibers.

The Publication in Molecular Crystals and Liquid Crystals (2000) vol. 353, p. 165-79.26 refs. discloses nanoparticles for ceramic and nanocomposite processing. Nanoparticles of various compositions have been fabricated by chemical processes. Sol-gel processes and precipitation processes have been used to prepare the nanoparticles and surface modifiers act as vehicles to tailor surface chemistry; the zeta-potential and to avoid agglomeration. In the first described industrial product development, SiO2 nanoparticles have been modified with CH3 groupings, and materials with high adhesive strength being flexible despite the low organic content have been obtained, and a binder system for glass fiber mats; temperature resistant up to 500 degrees C. has been developed. The second development is based on SiO2 nanoparticles coated with methacrylic groupings and TiO2 nanoparticles coated with epoxy groupings. The corresponding sols form high density coatings (approximately=65% kg volume) and are densified by crosslinking of the organics. These coatings have been used for the fabrication of interference layers (SiO2: n approximately 1.45; TiO2: n approximately 1.92) on plastic and glass. The Molecular Crystals and Liquid Crystals publication discloses nanoparticles for ceramic and nanocomposite processing. Sol gel and precipitation processes have been used to produce nanoparticles and surface chemistry of these nanoparticles is modified to prevent agglomeration. A binder system is used to incorporate nanoparticles into glass fiber mats or to create interference coatings. There is no suggestion of use of these coated fibers in a gypsum matrix. Since the fiber mat is already bonded together, it no longer has individual reinforcement fibers and cannot be distributed in a gypsum matrix.

The Publication in Macromol. Symp. (2000) discloses sol-gel derived nanoparticles as inorganic phases in polymer-type matrices. The nanoparticles are formed within a polymeric matrix or as thin coatings of ormosil layers. There is no suggestion concerning application of coatings to glass fibers to roughen the glass fiber surface to improve bonding with a gypsum matrix.

The Polymer (April, 2001) vol.42, no.9, p.3957-72. 189 refs. publication discloses chemical deposition of conducting polymers. The coating of different materials with conducting electroactive polymers (CEP), i.e.—polyaniline, polypyrrole, polythiophene, and their derivatives, provided by means of chemical polymerization, is briefly reviewed. The topics covered include the deposition of CEP (i) by bulk oxidative chemical polymerization, (ii) by surface-located polymerization, and (iii) by coating of micro- and nanoparticles. The coating of different materials like polymers, polymer particles, ion-exchange membranes, glass, fiber, textile, soluble matrices, and inorganic materials is reviewed. Literature reviewed covers a 5-year period, beginning from 1995. The Polymer publication discloses the chemical deposition of conducting polymers. The conducting polymers are coated on various substrates including glass fibers. There is no disclosure concerning the use of surface roughened glass fibers for use as reinforcement in a gypsum composite matrix.

There remains a need in the art for enhanced strength gypsum boards that are reinforced with glass fibers having surface structures that enable reliable load transfer from a gypsum matrix to the reinforcing glass fibers.

SUMMARY OF THE INVENTION

The present invention provides a gypsum board having a top and bottom surface with facer sheets, preferably composed of Kraft paper. Glass fibers with surfaces roughened by the incorporation of nano or micro particles are attached the glass fiber surface by a partially or fully cured silane based sizing composition, and incorporated within the gypsum matrix during manufacture of the gypsum board. The nano or micro particles are irreversibly bonded to the glass fiber surface by a silane based, cured polymer composition. The particles interlock with the surrounding gypsum matrix, preventing easy fiber pull out, thus transferring load from the gypsum matrix to the reinforcing glass fiber. The silane based polymer also provides a compliant load transfer due to the deformation characteristics of the polymer. Rapid separation of nano or micro particles from the glass fiber surface under load is thereby prevented. The aqueous silane based sizing composition coating comprises polymethylsiloxane with a catalyst, preferably polydiorganosiloxane. The nano or micro particles comprise colloidal silica, colloidal clay compositions or other inorganic particles. The glass fibers are coated with silane based sizing composition comprising nano or micro particles, and subjected to heat to partially or completely cure the sizing coating. In this manner, the nano or micro particles are caused to bond to the glass fiber, providing a roughened glass fiber surface. The glass fibers may be incorporated into the gypsum matrix individually or in combination by use of chopped short fibers, chopped long fibers or organized roughened glass fiber woven or non woven mats.

The process utilized in making the gypsum board comprises the steps of 1) mixing a composition of sizing coating with a suspension of 5 nm to 10 μm nano or micro particles in aqueous medium, together with anionic or cationic stabilizers in a silane based sizing composition;
2) applying the sizing coating with the nano or micro particles to the external surface of a reinforcing glass fiber;
3) curing the sizing composition with nano or micro particles by application of heat to irreversibly attach the nano or micro particles to the external surface of the reinforcing glass fiber and thereby form a rough external surface;
4) incorporating nano or micro particle bonded reinforcing glass fiber having a rough external surface into wet gypsum either as an addition of fine chopped glass fibers or as a placement of glass fiber mats within a cast gypsum wet mix;
5) delivering the cast gypsum wet mix with or without added chopped reinforcing glass fibers, with bonded nano or micro particles over a first facer sheet on a moving belt,
6) placing one or more reinforcing glass fiber mats with bonded nano or micro particles within the delivered gypsum wet mix,
7) placing a second facer sheet on the cast gypsum sheet; and
8) drying of the gypsum board.

BRIEF DESCRIPTION OF THE DRAWING

The invention will be more fully understood and further advantages will become apparent when reference is had to the following detailed description of the preferred embodiments of the invention and the accompanying drawing, in which.

DETAILED DESCRIPTION OF THE INVENTION

Figure 1A:
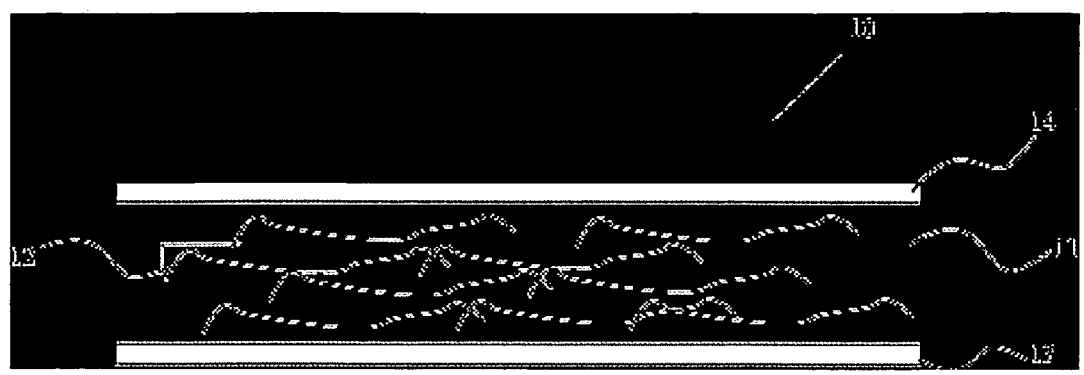
FIG. 1a is a diagrammatic representation of a conventional gypsum board with smooth glass fibers in a gypsum matrix.

Conventional gypsum boards incorporate glass fibers to provide fire resistance. When a gypsum board is exposed to temperatures greater than 176° F., the water of hydration in gypsum matrix is lost and the gypsum matrix crumbles. The presence of glass fibers in the gypsum matrix tends to hold the gypsum matrix together in the event of a fire. These glass fibers are not in any way bonded to the gypsum matrix and do not impart any significant flexural resistance or strength to gypsum boards.

The present invention relates to the use of surface roughened reinforcement glass fibers and mats having improved surface structures for fiber-reinforced gypsum board. In particular, the improved surface structure of glass fibers or mats is created by having nano or micro particles as additives in a sizing with silicone based binders that are used to coat the surface of the glass fiber used for reinforcing gypsum wallboards.

Generally stated, the invention relates to glass fibers used as an additive in wet gypsum mix and/or non-woven glass mats incorporated within a wet gypsum mix especially suited for use as a reinforcement, filler or line speed accelerator in the production of gypsum based drywall flooring, sheathing, and roof deck products. The reinforcement glass fibers or non-woven glass fiber mat is manufactured using nano or micro particles as additives to a silane based sizing composition to modify the glass surface from smooth to rough. The glass fibers or the glass fiber mat is first coated with the aqueous silane based sizing with nano or micro particles, dried, and either partially or completely cured. The nano or micro particles bond the glass fiber surface irreversibly but with a compliant polymeric silane based bond. Glass fibers or a non-woven glass mat thereby obtained is fed to gypsum slurry or similar slurries used in drywall manufacturing. The particles bonded to the glass fibers improve the transmission of forces at the glass-gypsum interface. Particles suitable for this purpose primarily, but not exclusively, consist of colloidal silica. Other particles include clay minerals and the like. Adhesion of the particles to the glass surface is irreversible and compliant, meaning that it is subject to deformation without fracture. The modified rough surface of glass fibers originating from adding these particles provides enhanced reinforcing properties to reinforced gypsum wallboards, and more precisely, increases the flexural strength of the gypsum board by increasing the pull out resistance of glass fibers, and enhancing the sharing of applied forces. The fibers also allow a reduction in weight of the wallboard by taking out gypsum while maintaining the mechanical properties of the final board. Thinner, stronger gypsum boards are thereby produced.

The nano or micro particles in the sizing composition are added to the glass fibers or non-woven glass mats and are suitable to adhere to the glass surface of those fibers which are used for reinforcing gypsum wallboards. Generally, the particles have diameters in the range of about 5 nm to 10 μm. Glass fibers suitable for use in the manufacture of the reinforced gypsum board have diameters ranging from 1 μm to 30 μm. The weight of the glass mat can range from 0.5 lb/square to 5.0 lb/square. The particles are applied in the form of aqueous suspensions as a colloid. The silane based sizing composition is chosen so that the colloidal suspension is not precipitated. Examples of these suspensions are anionic stabilized suspensions and cationic stabilized suspensions. Examples of the particles include colloidal silica (Klebosol, registered trademark of Clariant), or clay based minerals, such as nanoclays ("Nanomers" supplied by Nanocor Corporation, and "Cloisite" supplied by Southern Clay Products), and other inorganic particles such as alumina or carbon.

The invention is especially suited for reinforcement of building materials such as gypsum, but is applicable to situations where a rough surface of glass fibers is required to improve adhesion of reinforcing fibers to a building material matrix or other finishing materials.

The manufacture of the reinforced gypsum board starts with the coating of glass fibers, either as chopped short length fibers or as woven or non woven mats, with a sizing composition. The silane-based sizing composition, preferably in an aqueous base, contains nano or micro particles held as a suspension using anionic and or cationic stabilizers. It is critical that the silane sizing composition be chosen so that colloidal stabilized suspension of nano or micro particles are not precipitated. An example of silane based sizing which is compatible with colloidal silica has the composition 5 to 30 parts by weight of colloidal silica, 100 parts by weight of polydiorganosiloxane and from 1 to 5 parts by weight of dialkyltindicarboxylate catalyst per 100 parts by weight of the polydiorganosiloxane. This silane based sizing composition can be cured at a temperature in the range of 100-150° C. for 10 minutes. This composition is aqueous and is completely compatible with colloidal silica without initiating the precipitation of nano and micro particles. The sizing composition is conveniently sprayed onto the glass fiber surface to form a coating and then cured by heating at a curing temperature to polymerize the silane-based sizing composition. This curing process may be complete or may be partial allowing the curing to complete when the gypsum board is dried. After the glass fibers are cured either completely or partially, the nano or micro particles are permanently attached to the glass fiber surface, imparting a rough surface finish. When the glass fibers are incorporated into the gypsum matrix, the glass fiber cannot be easily pulled out of the dried gypsum matrix because the rough surface of the glass fiber surface prevents easy fiber pull out. As a consequence, the rough surface on the glass fiber imparts load transfer capability between the gypsum matrix and the reinforcing glass fiber providing a high strength, high flexure strength gypsum board. The bond between the nano or micro particles and the glass fiber surface is through a silane based cured polymeric composition which has deformation capability prior to fracture initiation. As a result, the nano or micro particles are compliantly attached to the glass fiber and the load transfer between the dried gypsum matrix and glass fiber is gradual and sustained without the separation of the nano or micro particle from the glass fiber surface, and without the initiation of fracture within the gypsum interface.

The chopped glass fibers, coated with nano or micro particles, are mixed with the wet gypsum mix. The wet gypsum mix is then cast on a first facer sheet placed on a moving belt. If glass fiber mats are used, the mats are coated with nano or micro particles, and are incorporated as layers within the cast gypsum wet mix on the moving first facer sheet. The top surface of the cast gypsum sheet is covered with a second facer sheet. The cast gypsum board is cut into sheets of required size, typically 8 feet long, and is cured in a drying oven to harden the gypsum matrix.

Figure 1B:
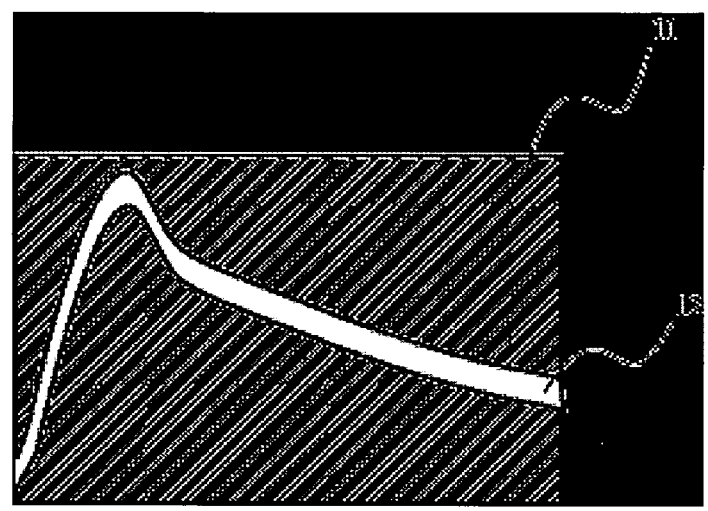
FIG. 1b is an expanded view of FIG. 1a of the gypsum matrix adjacent to a single glass fiber showing details of the glass fiber gypsum matrix interface.

Referring to FIG. 1a, there is shown at 10 a conventional gypsum board having a gypsum matrix 11, smooth surface glass fiber 12 and top and bottom facers 13 and 14. In the expanded view of FIG. 1b there is shown a smooth glass fiber which may be easily pulled from the matrix. There is no appreciable load transfer between the glass fiber and the gypsum matrix, and the glass fibers do not provide reinforcement to the gypsum board.

Figure 2A:
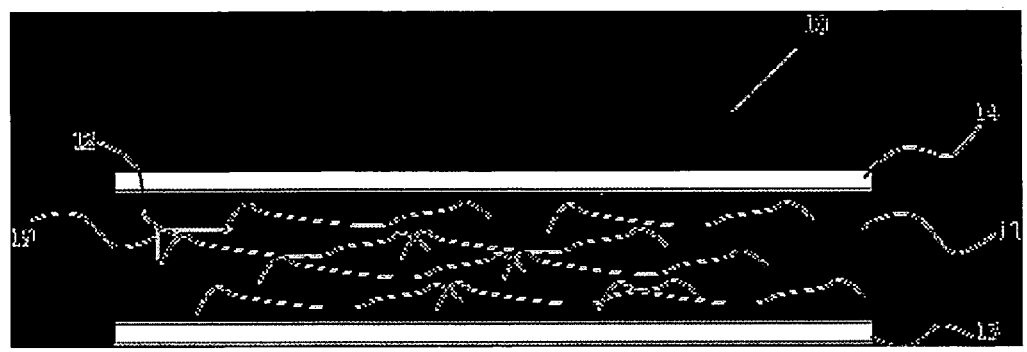
FIG. 2a is a diagrammatic representation of a gypsum board according to the subject invention with rough or harsh surface glass fibers in a gypsum matrix.
Figure 2B:
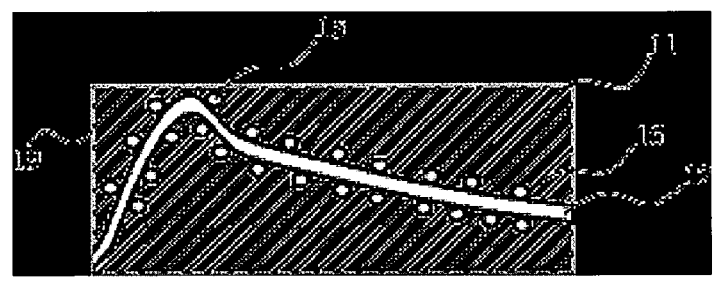
FIG. 2b is an expanded view of FIG. 2a of the gypsum matrix adjacent to a single rough or harsh surface glass fiber showing details of the glass fiber gypsum matrix interface.

Referring to FIG. 2a, there is shown at 10 a gypsum board according to the subject invention with gypsum matrix 11, roughened or harsh surface glass fiber 12, and top and bottom facers 13 and 14. In the expanded view a small area of window marked 19 in FIG. 2a is shown with greater detail in FIG. 2b. There is shown a rough harsh surface glass fiber, which is not easily pulled from the matrix. FIG. 2b shows nano or micro particles 15 irreversibly attached to glass fiber 12 by cured silane based sizing 16, and embedded within gypsum matrix 11. There is appreciable load transfer between the glass fiber and the gypsum matrix, and the glass fibers provide reinforcement to the gypsum board imparting strength and flexure resistance.

Figure 3A:
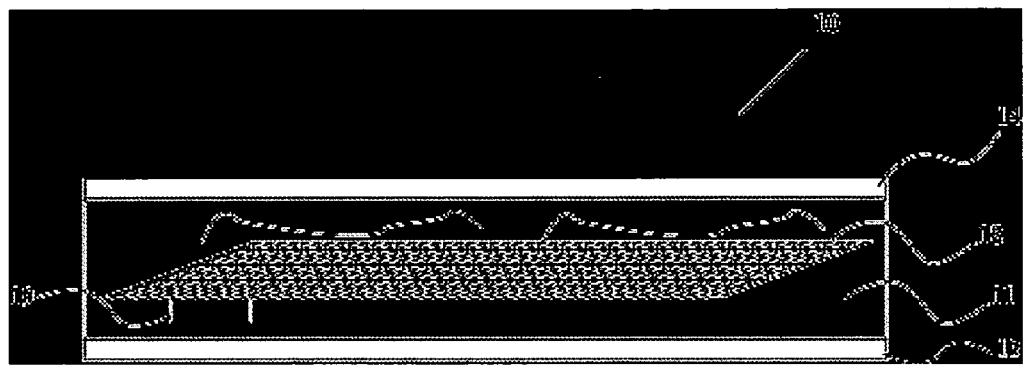
FIG. 3a is a diagrammatic representation of a gypsum board according to the subject invention with rough or harsh surface mat of glass fibers in a gypsum matrix.
Figure 3B:
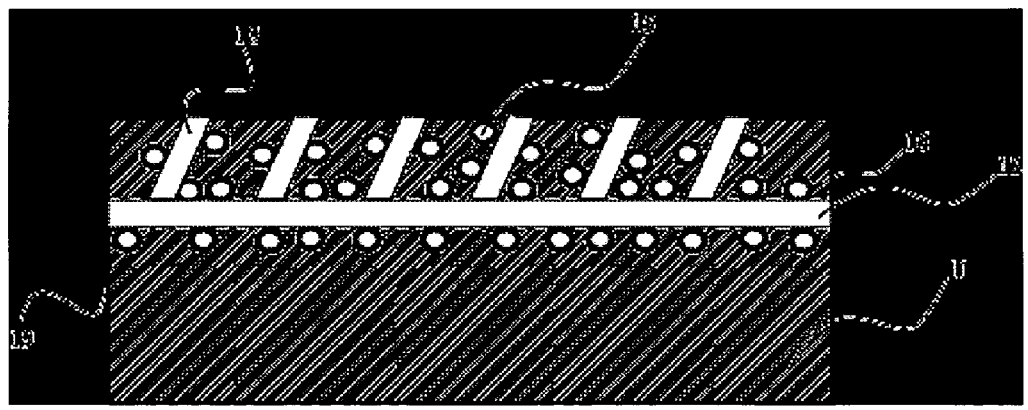
FIG. 3b is an expanded view of FIG. 3a of the gypsum matrix adjacent to a single rough or harsh surface glass fiber of the glass fiber mat showing details of the glass fiber gypsum matrix interface.

Referring to FIG. 3a, there is shown at 10 a gypsum board according to the subject invention with gypsum matrix 11, roughened or harsh surface glass fiber mat 18, and top and bottom facers 13 and 14. In the expanded view a small area of window marked 19 in FIG. 3a is shown with greater detail in FIG. 3b. There is shown a rough harsh surface single glass fiber 12 of the glass fiber mat 18, which is not easily pulled from the matrix. FIG. 3b shows nano or micro particles 15 attached to glass fiber 12 by cured silane based sizing 16, and embedded within gypsum matrix 11. There is appreciable load transfer between the glass fiber and the gypsum matrix and the glass fibers provide reinforcement to the gypsum board imparting strength and flexure resistance.

Advantageously, the process for producing enhanced strength gypsum boards using improved surface glass fiber reinforcement is readily adaptable to conventional gypsum board manufacture. The process of incorporation of reinforcing glass fibers with improved surface may use either individually or in combination of 1) incorporation of individual chopped glass fibers with improved surface within wet gypsum mix, 2) incorporation of non woven glass fibers with improved surface at one or more specific locations within the cast wet gypsum and 3) incorporation of woven glass fibers with improved surface at one or more specific locations within the cast wet gypsum.

The key features of glass fibers and glass fiber mats having improved surface structures in a gypsum matrix include, in combination, the features set forth below:

1. Composition means for suspending 5 nm to 10 μm of nano or micro particles in aqueous slurry together with anionic, cationic, or non-ionic stabilizers in a silane based sizing composition;
2. Bonding means for nano or micro particles to the external surface of a reinforcing glass fiber by means of a silane based sizing composition;
3. Curing means for irreversibly attaching said nano or micro particles to the external surface of said reinforcing glass fiber to form a rough external surface;
4. Incorporation means for adding nano or micro particle bonded reinforcing glass fiber with a rough external surface into wet gypsum through the addition of fine chopped glass fibers and/or the placement of non-woven or woven glass fiber mats;

5. Delivery means for the casting of gypsum wet mix with or without added chopped reinforcing glass fibers with bonded nano or micro particles over a first facer sheet on a moving belt;
6. Mat placement means for locating one or more reinforcing glass fiber mats with bonded nano or micro particles within the delivered gypsum wet mix;
7. Sheet placement means for locating a second facer sheet on cast gypsum sheet; and
8. Drying means for drying the gypsum board.

Having thus described the invention in rather full detail, it will be understood that such detail need not be strictly adhered to, but that additional changes and modifications may suggest themselves to one skilled in the art, all falling within the scope of the invention as defined by the subjoined claims.

What is claimed is:

1. A gypsum board, comprising:
a. a gypsum matrix having a bottom and a top;
b. a first facer sheet placed on the bottom of said gypsum matrix;
c. a second facer sheet placed on the top of said gypsum matrix;
d. one or more glass fibers placed within said gypsum matrix; and
e. an aqueous silane based sizing composition comprising nano or micro particles coating said glass fibers,
f. said coating being partially or fully cured to provide a roughened glass surface having said nano or micro particles bonded to said glass fibers prior to placement within gypsum matrix,
said coating being operative to increase the strength, flexure resistance and nail pull resistance of said gypsum board.

2. A gypsum board as recited by claim 1, wherein each of said first and said second facer sheets comprises Kraft paper.

3. A gypsum board as recited by claim 1, wherein said gypsum matrix comprises calcium sulphate hemihydrate (CaSO4.1/2H2O), calcium sulphate anhydrite (CaSO4), hydraulic setting cement and water.

4. A gypsum board as recited by claim 1 wherein said aqueous silane based sizing composition coating comprises polymethylsiloxane and cured at 100 to 150° C.

5. A gypsum board as recited by claim 1 wherein said nano or micro particles in the aqueous silane based sizing composition coating comprise colloidal silica.

6. A gypsum board as recited by claim 1 wherein said nano or micro particles in the aqueous silane based sizing composition coating comprise colloidal clay composition.

7. A gypsum board, comprising:
a. a gypsum matrix having a tap and a bottom;
b. a first facer sheet placed on the bottom of said gypsum matrix;
c. a second facer sheet placed on the top of said gypsum matrix;
d. at least one mat composed of glass fibers coated with a silane based sizing composition comprising nano or micro particles coating said glass fibers,
e. said coating being partially or fully cured to provide a roughened glass surface having said nano or micro particles bonded to said glass fibers;
f. said glass fiber mat, and being disposed within said gypsum matrix before said board is subjected to a curing process,
said coating on glass fiber mat being operative to increase strength, flexure resistance and nail pull out resistance of said gypsum board.

8. A gypsum board as recited by claim 7, wherein each of said first and said second facer sheets comprises Kraft paper.

9. A gypsum board as recited by claim 7, wherein said gypsum matrix comprises a gypsum mix including calcium sulphate hemihydrate (CaSO4.1/2H2O), calcium sulphate anhydrite (CaSO4), hydraulic setting cement and water.

10. A gypsum board as recited by claim 7 wherein said aqueous silane based sizing composition coating comprises polymethylsiloxane and cured at 100-150° C.

11. A gypsum board as recited by claim 7 wherein said nano or micro particles in the aqueous silane based sizing composition coating comprise colloidal silica.

12. A gypsum board as recited by claim 7 wherein said nano or micro particles in the aqueous silane based sizing composition coating comprise colloidal clay composition.

13. A gypsum board as recited by claim 1 wherein said nano or micro particles in the aqueous silane based sizing composition coating comprise alumina.

14. A gypsum board as recited by claim 1 wherein said nano or micro particles in the aqueous silane based sizing composition coating comprise carbon.

15. A gypsum board as recited by claim 7 wherein said nano or micro particles in the aqueous silane based siring composition coating comprise alumina.

16. A gypsum board as recited by claim 7 wherein said nano or micro particles in the aqueous silane based siring composition coating comprise carbon.

* * * * *